Patented Mar. 6, 1934

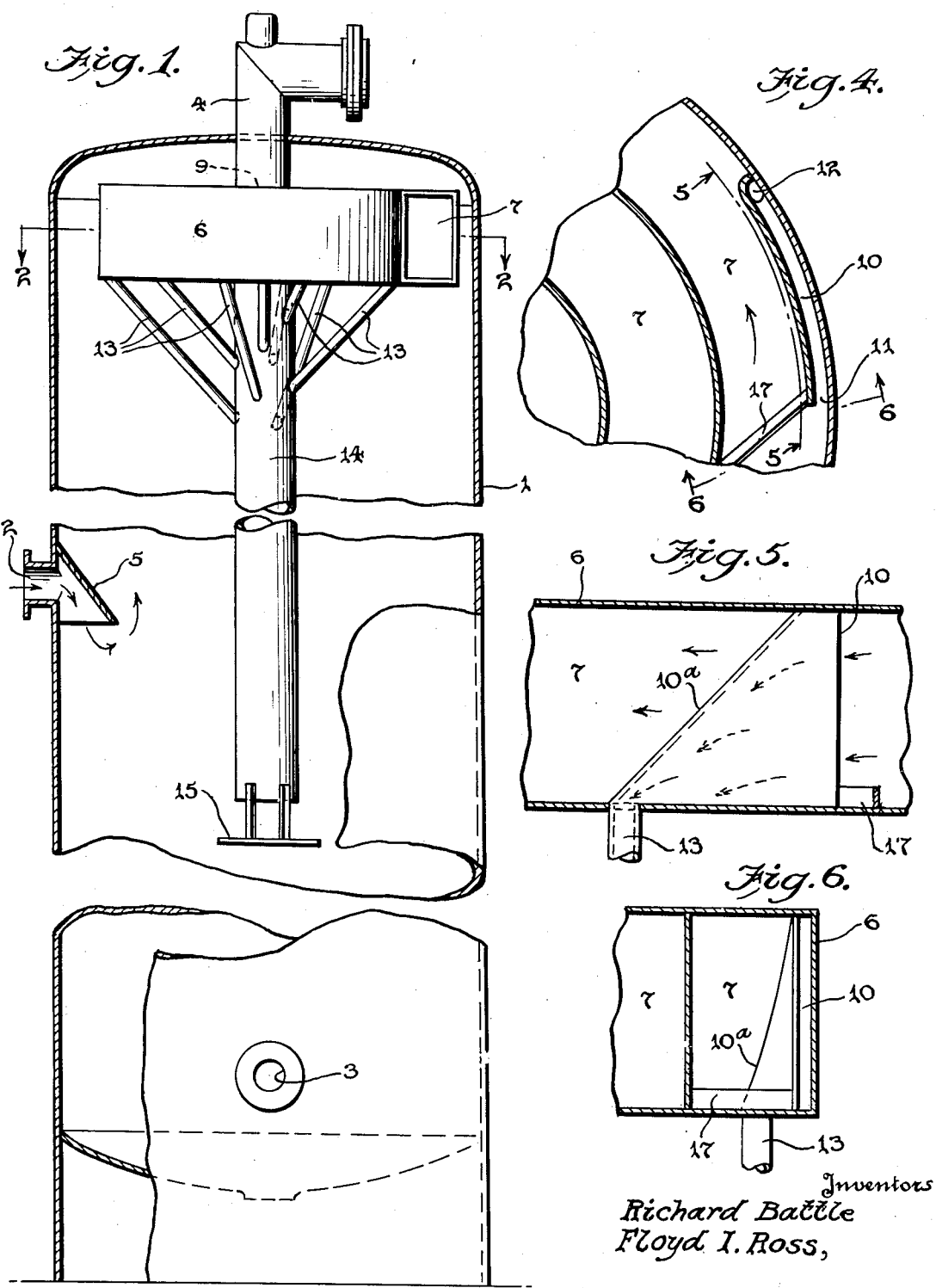

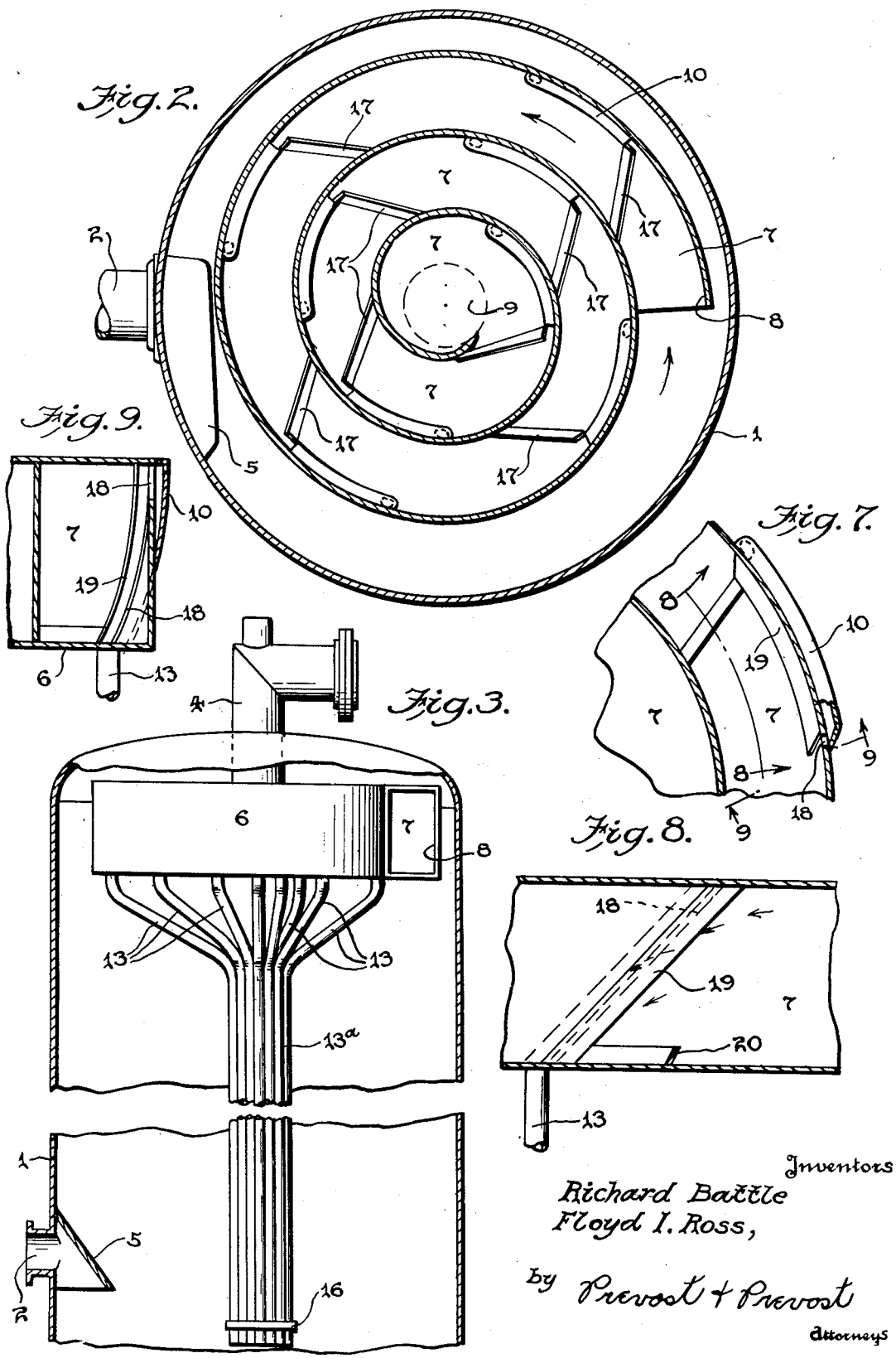

1,950,285

UNITED STATES PATENT OFFICE 1,950,285

LIQUID AND GAS SEPARATOR

Richard Battle, Tulsa, and Floyd I. Ross, Oklahoma City, Okla., assignors to Hanlon-Waters, Inc., Tulsa, Okla.

Application October 16, 1931, Serial No. 569,199½

4 Claims. (Cl. 183—2.7)

Our invention consists in new and useful improvements in apparatus for use in the separation of gases and liquids and/or solids, and relates more particularly to a centrifugal separating element which is adapted to be used in the upper chamber of any conventional design of oil and gas separator tank.

We are aware of the fact that numerous spiral or centrifugal separators have been employed for many years, but in the majority of those with which we are familiar, the gas is permitted to escape at different intervals from the spiral duct, thereby failing to maintain the velocity of flow. In our construction, it will be noted that the gas is compelled to continue its travel through a spiral duct, maintaining its velocity which gives us the full advantage of a combined centrifugal and kinetic force.

It is one of the objects of our invention to maintain the linear velocity of the gas flow, equally throughout the entire gas travel, from the entrance to the exit of the separating element. The linear velocity remaining equal, the centrifugal force will increase and as the gas carrying the last remaining fine particles of liquid or solids approaches the center of the separating element or terminus of the spiral passageway, the centrifugal force will become so great that it is impossible for any fine particles, however minutely divided to remain in suspension in the gas stream, the escape of said liquids or solids being brought about through the medium of a series of veins and oil collecting pockets arranged at predetermined points in the spiral duct.

With the above and other objects in view which will appear as the description proceeds, our invention consists in the novel features herein set forth, illustrated in the accompanying drawings and more particularly pointed out in the appended claims.

Referring to the drawings in which numerals of like character designate similar parts throughout the several views, Fig. 1 is a sectional view of a conventional separator tank showing our improved centrifugal separating element in place therein.

Fig. 2 is a transverse sectional view taken on line 2—2 of Fig. 1.

Fig. 3 is a view similar to Fig. 1 but showing a modified form of oil drain.

Fig. 4 is an enlarged sectional view showing one of the oil collecting pockets with the co-operating transverse veins.

Fig. 5 is a view taken on line 5—5 of Fig. 4.

Fig. 6 is a sectional view taken on line 6—6 of Fig. 4 to further illustrate the structure of the oil collecting pockets.

Fig. 7 is a view similar to Fig. 4 but showing a modified form of oil collecting pocket located externally of the spiral duct through which the oil is traveling.

Fig. 8 is a view taken on line 8—8 of Fig. 7, and

Fig. 9 is a further view taken on line 9—9 of Fig. 7 to further illustrate the external oil collecting pocket.

In the drawings, 1 represents the shell of a conventional oil and gas separator tank having the usual oil and gas inlet 2, oil outlet 3 and gas outlet 4. The oil and gas inlet 2 is preferably provided with a deflecting baffle 5 which initially directs the greater portion of the liquid content of the incoming mixture to the lower portion of the tank.

In the upper portion of the shell 1, preferably in close proximity to the top thereof, we provide a centrifugal separating element 6 which consists of a continuous spiral duct or passageway 7 of substantially uniform cross section from the entrance 8 to the central discharge opening 9. The element 6 is preferably substantially shallow and extends across the greater portion of the transverse area of the shell 1, the central opening 9 in the top thereof being arranged in communication with the gas outlet 4 and the entrance 8 opening into the interior of the shell 1 as clearly shown in the drawings.

Referring to the form of our invention shown in Figs. 4 and 5, at predetermined points in the inner surface of the outer wall of each of the convolutions of the passageway 7, we provide inwardly extending liquid receiving pockets 10, each of which has an opening 11 disposed at the end opposite to the direction of the flow through the passageway, the rear walls of said pockets being inclined as at 10a, downwardly toward the bottom of the passageway, from said opening 11. In other words, the walls at the rear extremity of the pockets converge in a restricted area. At the extreme end of each pocket, opposite the opening 11 we provide a drain port 12 which extends through the bottom of the separating element, and in the forms shown in the drawings, each of said ports is connected into a drain pipe 13, whereby the liquid collected in the pockets 10 is conducted to the lower portion of the tank 1.

In the form of our invention shown in Fig. 1, the drain pipes 13 terminate in a common downpipe 14 which may extend downwardly beyond the liquid level in the shell 1 or any other desired point therein, preferably below the oil and gas inlet 2. This pipe 14 carries at its lower extremity a baffle plate 15 which may be secured thereto and spaced from the discharge opening by any suitable means, the purpose of said baffle plate being to break up the downward flow of any gas which may possibly be carried with the liquid conducted through the down-pipe 14. Experiments have shown that there is actually a downward movement of gas and light gravity liquids in the drain pipes 13 and 14, and by the installation of the breaker or baffle 15 below the pipe 14, the energy of this down-flowing gas and light gravity liquids will be immediately dispensed.

Referring to Fig. 3 which shows a modified form of liquid drain, it will be seen that instead of merging into a common drain pipe as heretofore described, the drain pipes 13 are individually extended downwardly as at 13a, to a suitable point below the oil and gas inlet 2, the lower ends of said extensions being supported by any convenient means 16 which may be in the form of a bracket secured to the wall of the tank.

Adjacent the mouth end of the pockets 10 we provide transverse collecting veins 17 which are secured to the bottom wall of the passageway 7 at an angle to the direction of flow therethrough. These veins extend upwardly in the passageway for a predetermined height and are adapted to divert the liquid content of the mixture traveling through the passageway toward the mouths 11 of the pockets 10 as will be hereinafter set forth.

In the form of our invention shown in Figs. 7, 8 and 9, the pockets 10 are arranged on the outer face of the outer wall of the spiral passageway 7. In this arrangement, we provide an angularly disposed slot or opening 18 in the wall of the passageway adjacent the inner side of each pocket and in order to deflect the liquid or solid content of the mixture which is forced against the outer wall of the passageway by centrifugal force, through said slots and into the pockets, we provide an angularly disposed baffle or deflector 19. This baffle 19 is arranged with respect to the wall of the passageway, on an angle substantially identical with that of the slot 18, said angle being inclined downwardly toward the bottom of the passageway in line with the direction of flow therethrough. Said baffle 19 also projects inwardly at an angle with respect to the wall of said passageway as clearly shown in Fig. 7.

As in the case of the internal pocket arrangement, we provide veins 20 similar to veins 17 extending transversely of the passageway adjacent the lower extremity of the angularly disposed deflector 19 and projecting at an angle both to a vertical line through the passageway and to the direction of flow therethrough. The liquids and/or solids which are forced into the external pockets through the medium of baffles 19 and veins 20 are drained to the oil receiving portion of the tank 1 through drain pipes 13 as with the arrangement heretofore described.

Having thus described the construction and assembly of our improved oil and gas separator, its operation is as follows:—

The oil and gas and/or solids enter the separator tank 1 through the inlet 2 and are immediately diverted downwardly by the inlet baffle 5. The greater portion of the oil continues to flow to the bottom of the tank as it is heavier than the gas, but the gas rises to the upper portion of the separator tank and carries with it varying proportions of entrained liquids.

This gas and entrained liquids enter the separating element 6 through the opening 8 and naturally follow the duct or passageway 7 which imparts thereto a centrifugal force tending to deposit upon the outer walls of the passageway, the liquid content of the gas. The natural procedure for these liquids and solids is to adhere to the outer wall and travel along to some extent in the line of flow with the gas, or drain down the side of the wall on to the bottom of the passageway where they continue in the line of flow until they come in contact with the veins 17. The liquids and/or solids traveling along the bottom of the passageway are diverted by these veins toward the pockets 10, the kinetic energy of the liquids moving in the line of flow around the outer walls of the passageway, forcing all of said liquids to the extreme rear portion, there, being drained to the oil receiving portion of the tank 1 through drain pipes 13 and down-pipe 14.

As the gas continues around the passageway 7, more and more of the liquid and/or solid content thereof is separated therefrom by the series of veins and collecting pockets and finally the denuded gas, upon reaching the inner extremity of the passageway 7, flows upwardly through the central discharge opening 9 and on through the gas outlet 4.

This spiral construction of the separating element 6 enables us to take advantage of centrifugal force and kinetic energy to effect a complete separation of liquids and/or solids from the gas. Due to this force and energy, all of the liquids and solids are compelled to seek the extreme outside wall or the bottom of the passageway, and as the gas cannot leave the separator without traveling through the entire extent of the passageway 7, there is a velocity created and maintained therein due to the fact that all of the gas has to leave the separator through the outlet opening 9. The maintenance of this velocity is further assisted by the fact that there is a lower pressure in the gas line leading away from the gas outlet 4 than there is at the inlet 2 where the mixture of oil, gas and solids enters the separator.

With this velocity through the spiral passageway, a packed pressure is effected in the oil pockets which forces the liquids and solids through the drainage ports and pipes 13, thus preventing the entrance of any gas upwardly through these ports. For this reason, it will be noted that while we preferably employ drainage pipes 13 for conducting the separated liquids to the bottom of the tank 1, it would be possible to employ a separating element identical with that shown in the drawings but with the omission of the drain pipes 13.

The operation of the different forms of oil collecting pockets is practically identical, their sole purpose being to obstruct and collect the oil flowing around the outer walls of the passageway 7 by centrifugal force and that which is diverted toward said outer walls by the veins 17 on the bottom of the passageway. The internal pockets collect the oil through their open mouths 11 while the external pockets shown in Figs. 7 to 9 collect the oil through the angular slots 18, the baffles or deflectors 19 serving to obstruct and divet the flow of said oil through the slots.

From the foregoing it is believed that the construction and operation of our invention may be readily understood by those skilled in the art without further description, it being borne in mind that numerous changes may be made in the details disclosed without departing from the spirit of the invention as set forth in the following claims.

What we claim and desire to secure by Letters Patent is:—

1. In a liquid and gas separator tank, a separating element comprising an annular passageway, a series of substantially wedge shaped liquid collecting pockets arranged adjacent the outer wall of said passageway, the lower extremity of each of said pockets being substantially elongated in the direction of flow through said passageway said pockets terminating in rearwardly and downwardly inclined walls, the mouth of each pocket being substantially vertical and opening into the passageway, means at the rear extremity of each pocket for draining the liquids collected therein, and a gas outlet at the terminus of said passageway.

2. In a liquid and gas separator, a separating element comprising a spiral passageway, a series of substantially wedge shaped liquid collecting pockets arranged within said passageway adjacent the outer wall thereof, the lower extremity of each of said pockets being substantially elongated in the direction of flow through said passageway, said pockets terminating in rearwardly and downwardly inclined walls, the mouth of each pocket being substantially vertical and opening into the passageway, a forwardly directed transverse baffle angularly disposed with respect to the direction of flow through said passageway, located adjacent the mouth of each pocket for deflecting liquid toward said pockets, means at the rear extremity of each pocket for draining the liquids collected therein, and a gas outlet at the terminus of said passageway.

3. Apparatus as claimed in claim 1 wherein the means for draining the liquids from the pockets comprises a plurality of drain pipes, each terminating in communication with a common downpipe.

4. Apparatus as claimed in claim 1 wherein the means for draining the liquids from the pockets comprises a plurality of drain pipes each extending to a suitable point in the lower portion of the separator tank.

RICHARD BATTLE.
FLOYD I. ROSS.